(12) United States Patent
Corl et al.

(10) Patent No.: US 7,263,666 B2
(45) Date of Patent: Aug. 28, 2007

(54) TARGETED REMOTE GUI FOR METADATA GENERATOR

(75) Inventors: Mark T. Corl, Princeton Junction, NJ (US); Richard Gong, Middlesex, NJ (US)

(73) Assignee: Triveni Digital, Inc., Princeton Junction, NJ (US)

( * ) Notice: Subject to any disclaimer, the term of this patent is extended or adjusted under 35 U.S.C. 154(b) by 625 days.

(21) Appl. No.: 10/118,061

(22) Filed: Apr. 9, 2002

(65) Prior Publication Data

US 2002/0196276 A1   Dec. 26, 2002

Related U.S. Application Data

(60) Provisional application No. 60/282,190, filed on Apr. 9, 2001.

(51) Int. Cl.
*G06F 3/00* (2006.01)

(52) U.S. Cl. ............. 715/778; 715/746; 715/707; 725/147

(58) Field of Classification Search ........ 715/744, 715/745, 746, 747, 707; 725/147
See application file for complete search history.

(56) References Cited

U.S. PATENT DOCUMENTS

| | | | | |
|---|---|---|---|---|
| 5,412,375 A | * | 5/1995 | Wood | 455/451 |
| 5,606,702 A | * | 2/1997 | Diel et al. | 719/329 |
| 6,078,955 A | * | 6/2000 | Konno et al. | 709/224 |
| 6,182,094 B1 | * | 1/2001 | Humpleman et al. | 715/513 |
| 6,185,491 B1 | * | 2/2001 | Gray et al. | 701/36 |
| 6,198,750 B1 | * | 3/2001 | Buchholz et al. | 370/395.42 |
| 6,268,849 B1 | * | 7/2001 | Boyer et al. | 725/40 |
| 6,633,911 B1 | * | 10/2003 | Matsuzaki et al. | 709/224 |
| 6,651,253 B2 | * | 11/2003 | Dudkiewicz et al. | 725/114 |
| 6,754,855 B1 | * | 6/2004 | Denninghoff et al. | 714/48 |
| 6,781,607 B1 | * | 8/2004 | Benham | 715/744 |
| 6,996,779 B2 | * | 2/2006 | Meandzija et al. | 715/736 |
| 2002/0059581 A1 | * | 5/2002 | Billock et al. | 725/25 |
| 2002/0059610 A1 | * | 5/2002 | Ellis | 725/58 |

* cited by examiner

*Primary Examiner*—Kristine Kincaid
*Assistant Examiner*—Ryan Pitaro
(74) *Attorney, Agent, or Firm*—Birch, Stewart, Kolasch & Birch, LLP

(57) ABSTRACT

A computer-implemented method and system for remotely managing metadata associated with a metadata generator in a broadcast system, are disclosed. The method includes providing a targeted user interface to a current user, and managing remotely the metadata using the targeted user interface.

31 Claims, 10 Drawing Sheets

Remote User Administration

Remote users:

| User Name | User ID | Password | Edit Events | UI Type |
|---|---|---|---|---|
| Richard Gong | rgong | test1234 | ☐ | Regular UI |
| Mark Corl | mcorl | test5678 | ☑ | Lite UI |

[Add User] [Remote User] [OK] [Cancel]

FIG. 4

| Minor Num | Short Name | Extended Name | Extended Text | Service type | Prog Num | Hidden | Access Restricted |
|---|---|---|---|---|---|---|---|
| 1 | LG 1 | LG Standard | LG Affiliate | ATSC Digital Television | 3 | ☐ | ☐ |
| 2 | LG 2 | LG Alternative | LG Alternative Broadcast | ATSC Digital Television | 4 | ☐ | ☑ |

Channel: LG-DT    Major Channel Number: 3    Frequency: 265000000

FIG.7

Add Event

Date (mm/dd/yyyy): [04] / [19] / [1999]

Start Time: [20] : [00]

End Time: [20] : [20]

☐ Modify end time and duration of previous event
☐ Modify start time and duration of next event Event Name: [Presidential Address]

Description: [Live from the White House.]

☑ Closed Caption
☐ Stereo

Content Advisories and Ratings:

○ No Rating Message
● TV Rating: [TVG ▶]
○ MPAA Rating: [None ▶]

[OK]   [Apply]   [Cancel]   [Add This & Another]

FIG. 8

TARGETED REMOTE GUI FOR METADATA GENERATOR

The present application claims the priority benefit of U.S. Provisional Application No. 60/282,190 filed on Apr. 9, 2001, the entire contents of which are herein fully incorporated by reference.

BACKGROUND OF THE INVENTION

1. Field of the Invention

The present invention relates to a method and system for providing a targeted graphical user interface (GUI) for a metadata generator or the like.

2. Discussion of Related Art

A program and system information protocol (PSIP) generator system according to a related art is generally installed near DTV encoder systems because it must feed a high volume (bit rate) of data directly to the ncoder system. A DTV broadcast center usually maintains a central location for all equipment so that it can be easily managed by a group of station engineers and so that only the station engineers can make adjustments to the equipment.

However, the PSIP information managed by the PSIP generator system needs to be manipulated by a number of different individuals for a number of different purposes. Generally, these individuals should be restricted to access only certain data that are pertinent to their job function. Further, these individuals would like to manipulate the data as a normal part of their daily job activities implying that the data needs to be accessible at their normal working location instead of at the central location for all the DTV equipment. Finally, the mechanism of manipulating the data should not be burdensome to the station workers.

General remote user interfaces are known in the computer industry. The X-Windows system provides for a remote user interface from one machine to another. PC ANYWHERE is a product sold for Windows that provides exactly these same functions. Further, a product from Harris (Lucent Technologies) provides a general remote GUI to manipulate PSIP data whereby the PSIP generator itself can be controlled remotely. But such a remote GUI has the same configuration and structure as a local GUI. That is, according to the related art, the same general GUI is used for remote controlling as well as local controlling of the PSIP generator. Further, such GUI is not targeted or user-specific, such that the same GUI is provided to all types of users, regardless of their job functions, credentials, or need.

Therefore, there is a need for a PSIP generator that provides a targeted or customized GUI, either for remote or local control, that is task-specific and/or user-specific. Further, there is a need for a PSIP generator that provides a remote or local GUI that is visually different from the existing, general GUI in order to denote its customized nature.

On the other hand, web or network distribution of products is known in the general computer industry. Specific version distribution of products based on specific credentials is also known in the general computer industry. In addition, product licensing by counting instances of, and allowing remote machines to obtain, operation keys is known in the general computer industry.

However, no known PSIP generator interfaces are distributed via web or network distribution. As no custom GUI (relative to a basic, maximally functional GUI) is known for a PSIP generator, no specific version distribution of PSIP generator GUIs based on specific credentials is known. And thus no PSIP GUI licensing by counting instances of, and allowing remote machines to obtain, operation keys is known.

Accordingly, there is a need to provide a more targeted or customized GUI for controlling metadata such as PSIP data, which can be easily distributed to appropriate users with increased efficiency and without compromising security.

SUMMARY OF THE INVENTION

The present invention provides a targeted or customized GUI for a metadata generator, which overcomes the above-described and other problems and disadvantages associated with the related art.

The present invention, in part, provides at least one targeted GUI to a program and system information (PSIP) generator or any system requiring modification and/or management of certain data, either remotely or locally, which is task specific in contrast to a basic, maximally functional GUI.

The present invention, also in part, provides at least one customized GUI, either remotely or locally, that is visually different from the basic, maximally functional GUI in order to denote its customized nature and/or to enhance its user-friendliness toward the user to whom it is customized.

The present invention, also in part, provides specific version distribution of PSIP generator GUIs or other metadata generators based on specific credentials.

The present invention, also in part, provides PSIP GUI licensing by counting instances of, and allowing remote machines to obtain, operation keys.

The present invention, also in part, provides a PSIP generator interface that can be distributed via the world wide web or a private network.

Among other things, the present invention provides:

a specific, customized solution to each PSIP user's data entry needs, wherein a set of solutions is available within a given product, it being possible to customize such solutions for particular station needs;

a specific technology to control aspects of a PSIP generator and the associated data without physical access to the actual generator;

a technology for selecting the specific control interface (GUI) by providing credentials to a central service (web site) at every use occasion;

a technology for selecting the specific control interface (GUI) by providing credentials once allowing the installation of a permanent interface at the client machine;

a technology for installing the specific control interface (GUI) by providing implied credentials, where the control interface can be installed only on users' machines; and a technology for licensing specific control interfaces based on the number of interfaces active.

BRIEF DESCRIPTION OF THE DRAWINGS

The present invention will become more fully understood from the detailed description given hereinbelow and the accompanying drawings which are given by way of illustration only, and thus do not limit the present invention.

FIGS. 4-10 are examples of different screen images usable in the embodiments of the present invention.

DETAILED DESCRIPTION OF PREFERRED EMBODIMENTS

Figure 1:
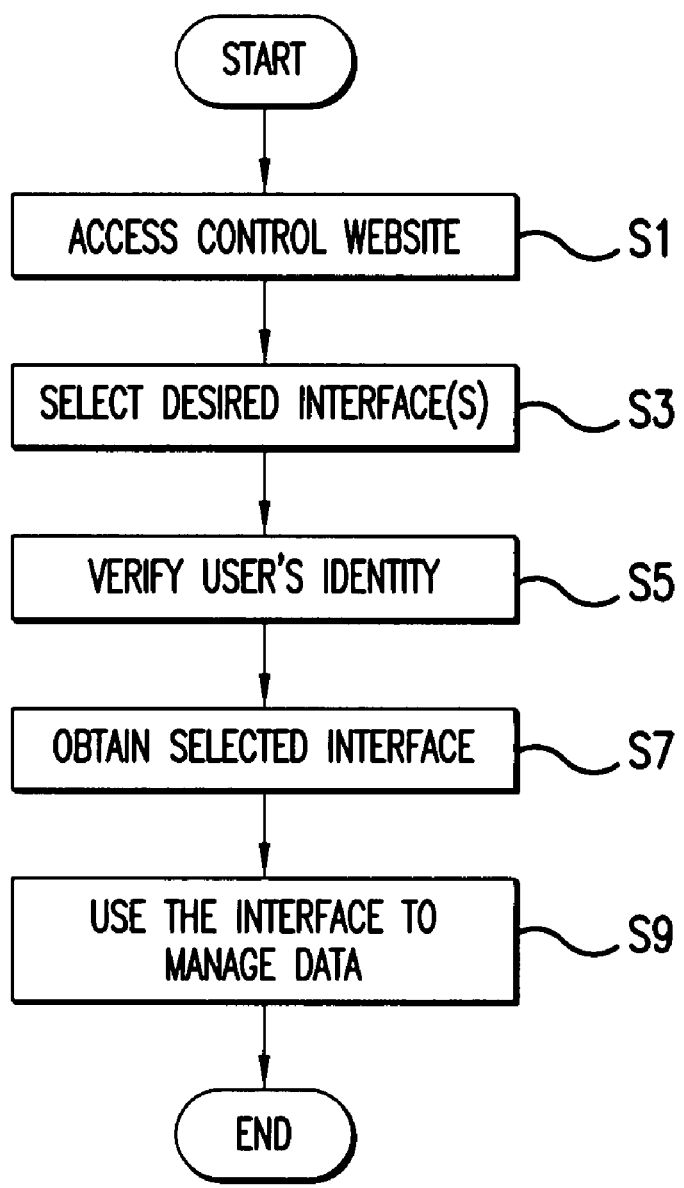
FIG. 1 shows a flow chart illustrating processing steps of a method of providing a targeted remote GUI to a metadata generator according to a first embodiment of the present invention.

FIG. 1 shows a flow chart for illustrating processing steps of a method of providing a targeted remote GUI to a metadata generator or other system according to a first embodiment of the present invention. In this example, the processing steps are implementable in a PSIP generator system for a DTV environment; however, these steps can be implemented in any system or device that requires management of data using some remote user interface.

As shown in FIG. 1, in the present method, a user at a particular broadcast station or other location connects to the Internet, intranet, extranet, or any other communications network, and accesses a predetermined website to obtain an appropriate GUI to control data in the desired system in Step S1. This predetermined website is also referred to herein as a control website. Inherent to Step S1 and subsequent steps is the use of a computer or other computing device (e.g., PC, PDA, work station, two-way mobile phone, etc.) at the user side, the use of any existing mechanism for connecting the user's computing device to the communications network, and the use of a server or the like that maintains the control website for communicating with the user's computing device via the communications network.

Once the user accesses the control website, in Step S3, the user selects a desired user interface such as a particular GUI. One of the many ways to implement this step is as follows. The control website may display on the user's display device a page displaying a list of different types and/or functions of user interfaces for controlling different data. The user then selects the appropriate user interface from the list based on the need, the desired operation, their job function, etc. using a user input device such as a keyboard, mouse, etc associated with the display device. The selected user interface can be a user interface providing only specific functions.

In Step S5, the user's identity is verified to ensure that the user is entitled to access the selected user interface(s). This may be implemented by configuring the control website to request an input of a user ID, password, passcode, and/or other credential data and comparing the input credential data with prestored credential data to verify the user's identity or to determine whether the user has proper access to the selected user interface(s).

Once the user's access is granted, the user accesses in Step S7 the selected user interface. That is, the control website displays the page(s) of the selected user interface on the user's display device. Then in Step S9, the user uses the selected user interface to control and modify the metadata such as PSIP data associated with the PSIP generator system.

In the first embodiment, the order of certain steps in FIG. 1 may be switched. For instance, Step S5 may be performed first prior to Step S3 if desired. In this case, the user's identity is verified first before the user is able to make any selection of a desired user interface.

Figure 2:
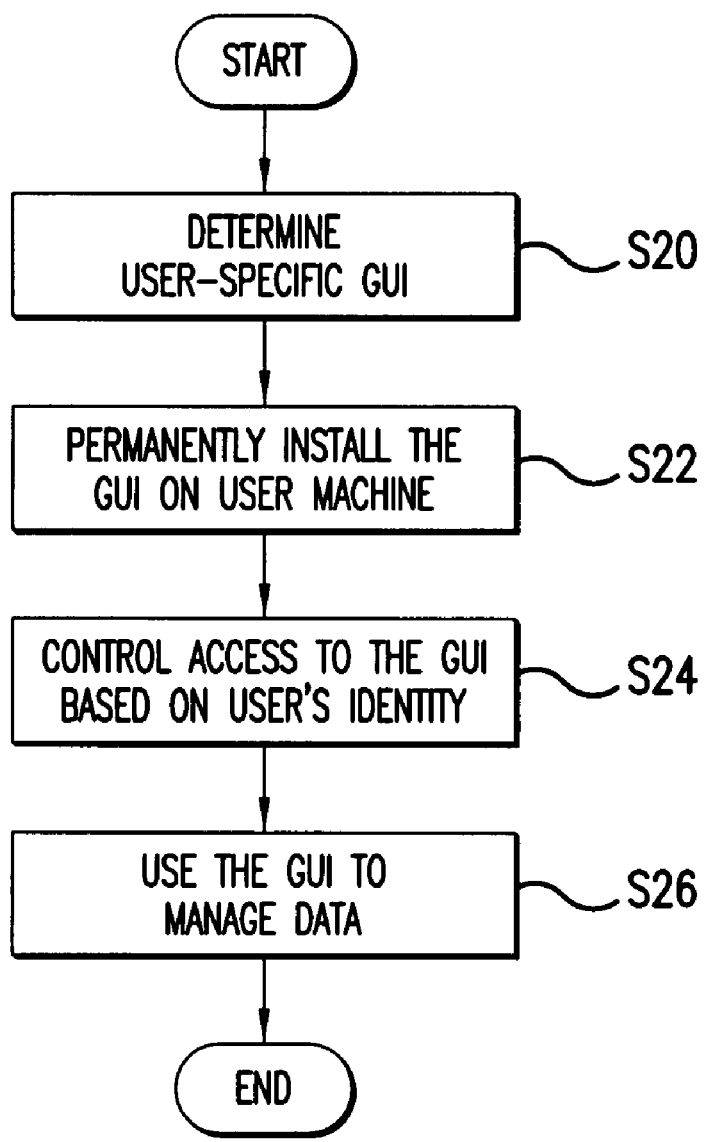
FIG. 2 shows a flow chart illustrating processing steps of a method of providing a targeted remote GUI to a metadata generator according to a second embodiment of the present invention.

In a second embodiment of the present invention, instead of the web-based interface of the first embodiment, a specific GUI to the PSIP generator is permanently installed on a particular user machine. It should be noted that the implementation of the second embodiment does not require a web connection at all. FIG. 2 shows a flow chart illustrating processing steps of a method of providing a targeted GUI according to this second embodiment of the present invention.

As shown in FIG. 2, in Step S20, at a control center, a user-specific user interface such as GUI is determined based on the user's functions, desired operations, etc. That is, a GUI that is specifically configured to meet the needs of a current user is determined and provided. This can be implemented by obtaining the user's credential data and selecting the desired characteristics of a GUI from a list of possible functions, components, capabilities, etc. for GUIs. This selection process may be performed manually or automatically in response to the user's input of particular credentials such as job title, job code, user ID, etc.

Then in Step S22, the user-specific or customized GUI is installed permanently on one or more of the user's machines such as a PC, PDA, etc. Then in Step S24, the user's identity is verified each time the user desires to access this GUI through the user's machine. Step S24 may be an optional step. Once the user accesses the user-specific GUI, the user uses the GUI in Step S26 as needed to control or modify PSIP information or other data.

In still another embodiment, a hybrid of the methods according to the first and second embodiments discussed above is possible in which the user provides credential data through the control website as in the first embodiment to obtain the user-specific GUI software, which would then be installed on the user's machine. Once installed, the user would operate the GUI as needed to manage the metadata.

In each of these embodiments, optionally a System Administrator (SA) can use a utility available from the main PSIP or metadata generator software to maintain remote user access characteristics including user ID, password, whether the user can edit events remotely, and the type of User Interface (UI) that will be sent to the user when he logs in remotely. A computer screen displaying such information can be provided to the SA.

Figure 3:
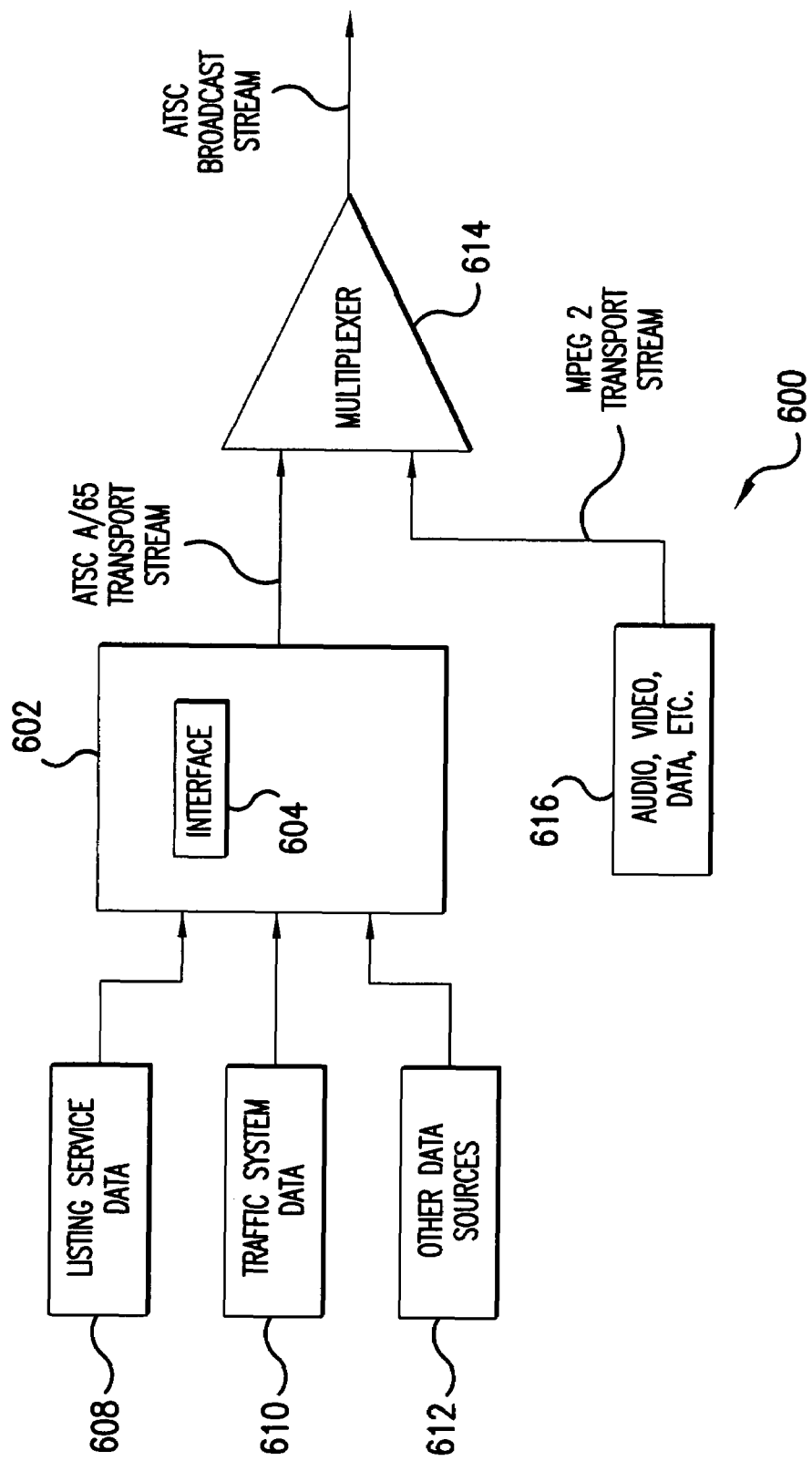
FIG. 3 is a block diagram of a PSIP generator system according to an embodiment of the present invention.

FIG. 3 is a block diagram of a program and system information protocol (PSIP) data generator system 600 providing a targeted remote GUI according to an embodiment of the present invention. The methods according to the first, second and third embodiments discussed above can be implemented in the PSIP data generator system 600 of FIG. 3.

As shown in FIG. 3, the system 600 includes: a PSIP generator 602 according to the invention; sources of data upon which the PSIP generator operates, such as a source 608 of listing service data, a source 610 of traffic system data and a source 612 of other data; a multiplexer 614 to incorporate the PSIP data from the PSIP generator 602 into an A/65-compliant DTV signal or other appropriate signal; and a source 616 of audio data, video data, etc.

The PSIP generator 602 includes an interface unit 604 which particularly implements at least one of the methods discussed above according to the first (FIG. 1), second (FIG. 2) and third embodiments. Any additional hardware and/or software needed to implement the specific method of the present invention is also included in the system 600 as part of the present invention. It should also be noted that the interface unit 604 within the PSIP generator 602 may not necessarily correspond to a discrete hardware unit. Rather, the interface unit 604 can represent a functional unit corresponding to one or more program segments of the software that can embody the invention.

The PSIP generator 602 according to the present invention can be implemented by adapting a known PSIP generator according to the discussion herein. An example of a known PSIP generator is the PSIP BUILDER PRO brand of PSIP generator manufactured and sold by TRIVENI DIGITAL INC., the assignee of the invention. The PSIP BUILDER PRO itself is based upon a programmed PC having a Pentium type of processor using the Microsoft Windows NT 4.0 operating system, but it can be based on other type of operating system if needed.

FIG. 3 depicts the context of a digital television broadcast such as a terrestrial broadcast, and more particularly one that is compliant with the ATSC, where each event is a program, and the schedule data is PSIP data. However, the present invention is readily applicable to any television format, e.g., analog terrestrial, analog cable, digital cable, satellite, etc., for which an electronic schedule is maintained and corresponding data is sent to a receiver for the purpose of presenting an electronic program guide (EPG) to a viewer.

FIGS. 4-10 provide different examples of screen images usable in the present invention, particularly, in a PSIP generator system such as the system 600 in FIG. 3. Obviously, other variations are possible and contemplated as part of the present invention.

As shown in FIG. 4, a list of users and their properties such as the user ID, password, UI type accessed, etc., can be maintained by a SA or the like from a central location or the control website location. For this application, examples of UI types that can be accessed by users may include, but are not limited to: Newsroom UI, Lite UI (for editing events only), and a UI with read-only capabilities. In this example, FIG. 4 shows that two remote users have access to the read-only UI (Regular UI) and the Lite UI. Using this page, users can be added or removed and the authorized properties of the users as well as authorized UI types accessible by the users can be modified to manage such information.

Figure 5:
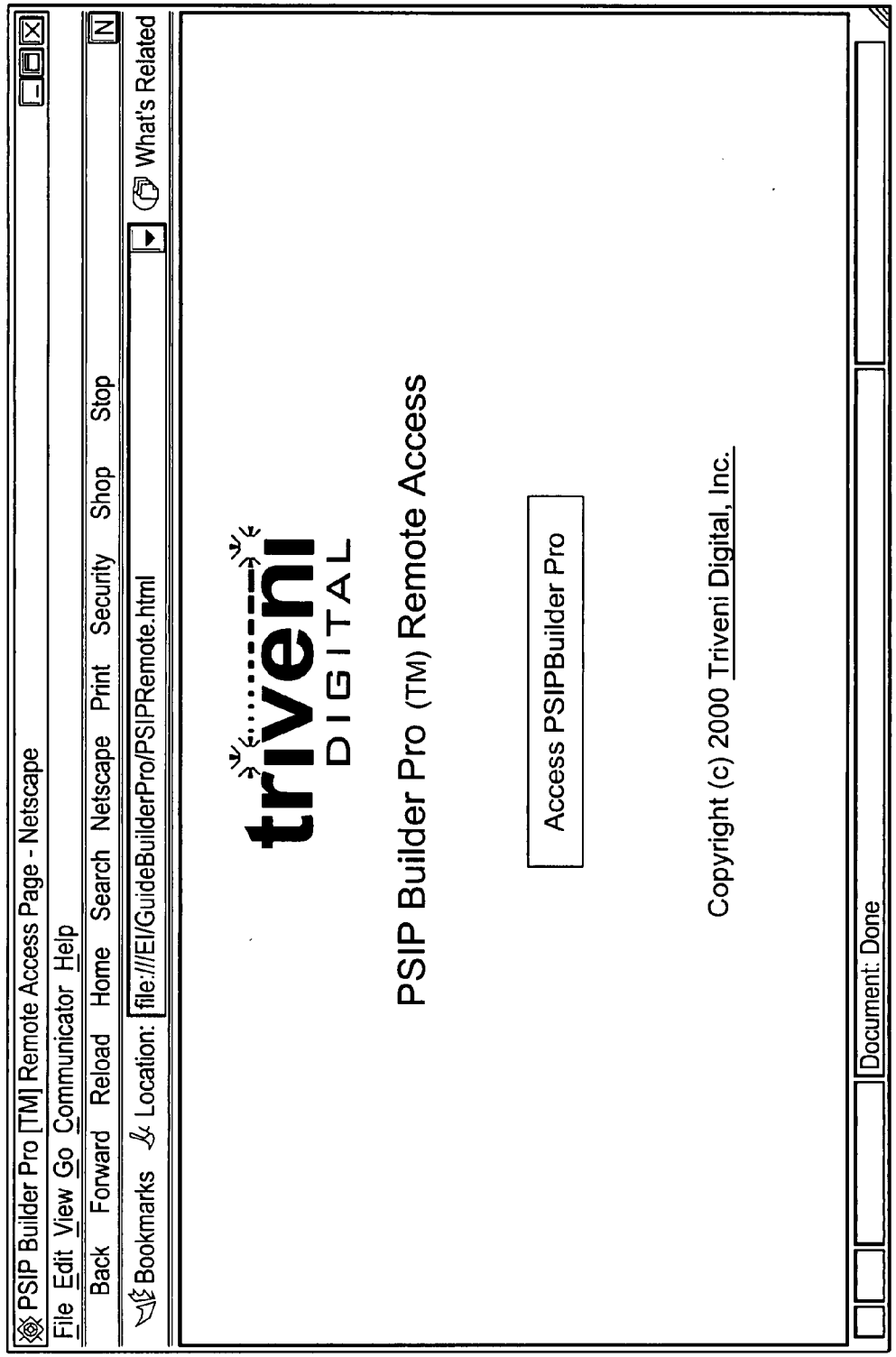

FIG. 5 shows an example of a web page of the control website which may be displayed to the remote user when the remote user accesses the control website (e.g., in Step S1 of FIG. 1). In this example, once the control website is accessed, the user clicks on the "Access PSIPBuilder Pro" button on the web page to trigger a login dialog window to pop up. The user then enters, e.g., a user ID and password, into the login window to proceed. Such login dialog windows are known. Based on the user ID and password that have been entered, the host PSIP generator software sends the UI assigned to the user according to the user's particular business needs or other properties, as discussed above in the methods of the present invention.

Figure 6:
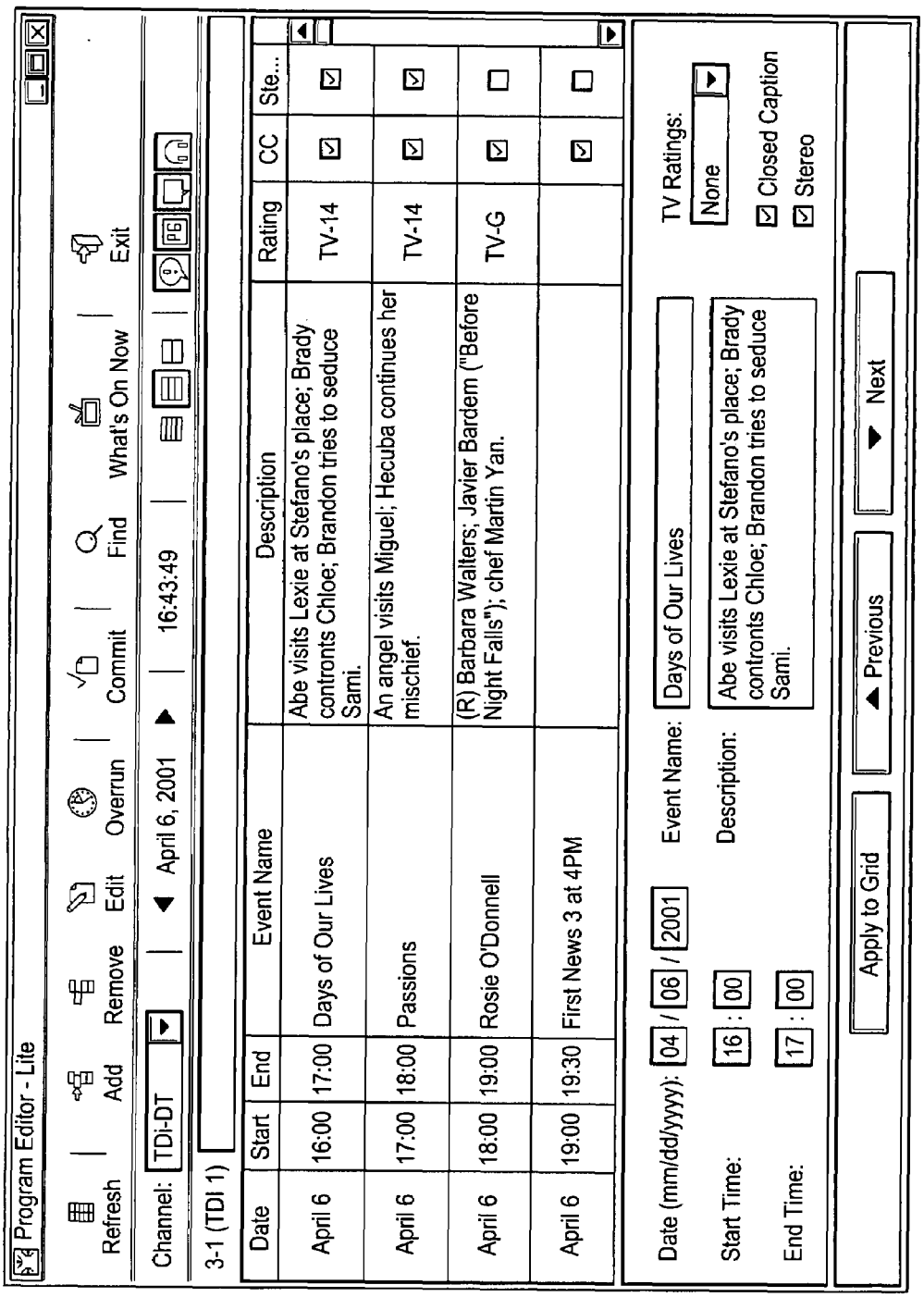

FIG. 6 is an example of a screen image of a Lite UI which can be displayed, e.g., when the current user has the user ID of "rgong" in FIG. 4. As shown in FIG. 6, this GUI screen particularly shows a program editor which allows the user to easily view and modify certain program-related information such as ratings, programs, channels, etc. of the PSIP data without ever having to deal with the complexity of the ATSC A/65 standard or other standard being used. By simply clicking on a menu item or toolbar button, the modification of data is easily implemented.

FIG. 7 is an example of a screen image of a GUI which displays a service editor for editing different types of services provided according to the present invention. As shown in FIG. 7, the user can easily view and modify certain service-related information by manipulating toolbar buttons or icons.

Figure 9:
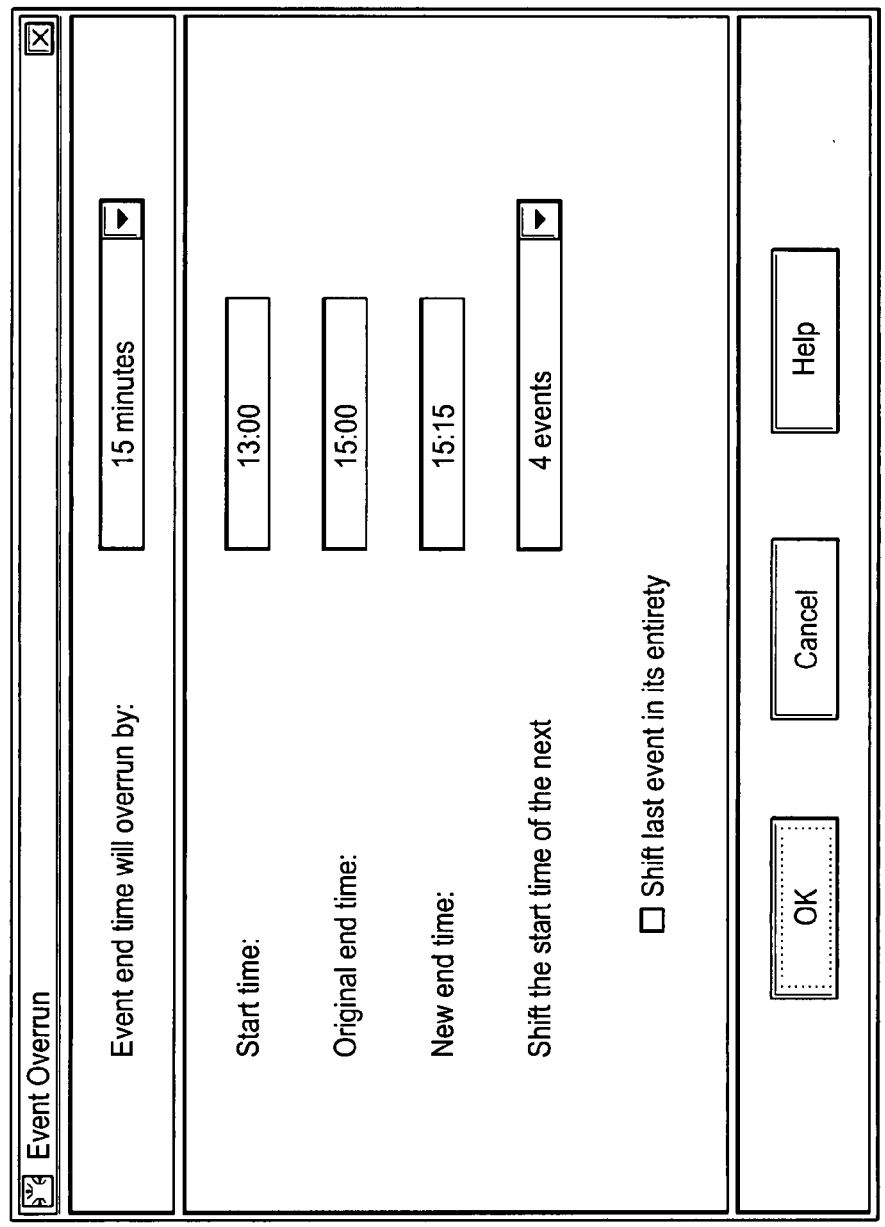
Figure 10:
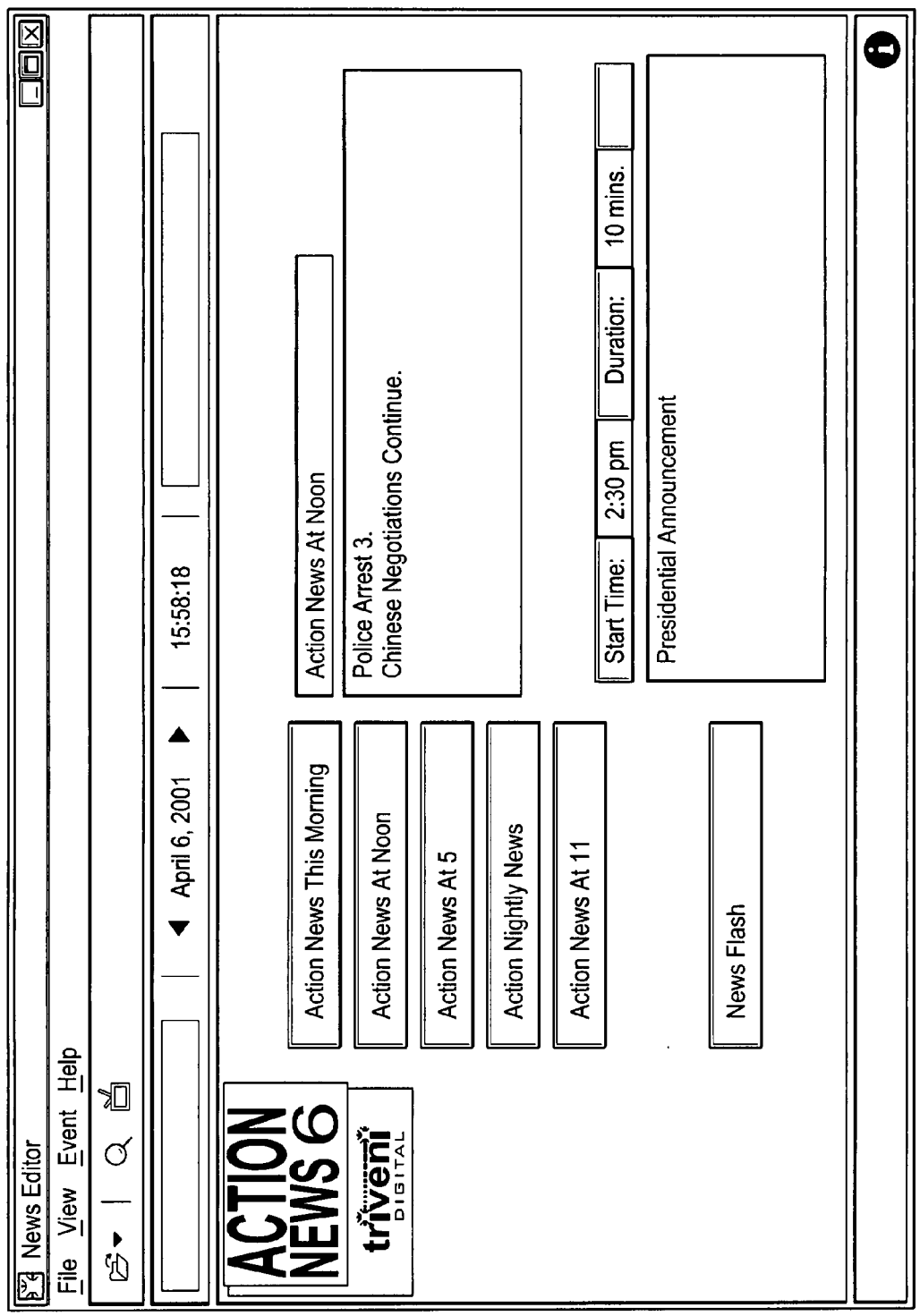

FIGS. 8, 9 and 10 are examples of different screen images displayable by the user-specific GUI of the present invention. Particularly, FIG. 8 depicts an example of an "Add Event" UI for adding a particular TV event/program. FIG. 9 depicts an example of an "Event Overrun" UI for modifying event/program properties, especially when an event runs over the predetermined duration. FIG. 10 shows an example of a "News Editor" (news room) UI. In FIG. 10, among other things, the dialog window is branded with a logo of the station using it; the standard news programs are displayed as buttons; selection of a button allows the description of the selected program to be edited; only a single day is displayed; the top bar allows the desired day to be selected; a news flash button allows a new event to be added that is a news flash. Such a news room GUI can have multiple news flash buttons, however, only one has been shown for simplicity. As a way to control PSIP data content modification, news room personnel could be restricted to modifying PSIP data only by way of the news flash button.

The screen images displayed in FIGS. 4-10 are mere examples only; obviously, other examples and variations are possible and such are intended to be part of the present invention.

In another embodiment, the client/user software may need to obtain licensing information from the centrally located system to allow the user client interface to run, but this only provides control of the number of users—not the users' ability to do work once licensed. An example of this instance would be a News Room client. Particularly, the customer could buy two licenses for the news room but could load the GUI onto every machine in the news room. Only two users could be active at any one time. The News Room client would only allow the News Room personnel to change entries associated with the News in the PSIP generator database (and so would be customized relative to the basic, maximally functional PSIP GUI). All other entries would not even be displayed (in contrast to the basic, maximally functional GUI).

Certain aspects of the present invention have been described in terms of a PSIP generator and the ATSC system of which PSIP is a component, but are equally applicable to other digital television systems such as DVB (and its metadata known as System Information (Si)), ARIB (and its analogous component to PSIP data), etc. The present invention can be implemented using any known hardware and/or software. Any existing computer programming language such as Java can be used to implement the processing steps of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A method of remotely managing program and system information protocol (PSIP) data associated with a PSIP generator in a broadcast system, the method comprising: providing a targeted user interface to a current user at a remote location, wherein the current user is associated with a particular broadcasting station that is broadcasting data to end users; and managing remotely the PSIP data using the targeted user interface, wherein the step of providing the targeted user interface includes: providing to the current user for the user's selection a list of available user interfaces for the PSIP generator through a communications network, and maintaining a count of user interfaces currently being accessed by non-end users to control access to the interfaces at a given time.

2. The method of claim 1, wherein the step of providing the targeted user interface further includes:
providing to the current user through the communications network, as the targeted user interface, at least one of the user interfaces selected by the current user, whereby the current user can access the targeted user interface through the communications network.

3. The method of claim 2, wherein the communications network is either the Internet or a private network.

4. The method of claim 2, wherein the current user selects said at least one of the user interfaces using a web browser.

5. The method of claim 2, wherein the step of providing the targeted user interface further includes:
verifying an identity of the current user.

6. A method of remotely managing program and system information protocol (PSIP) data associated with a PSIP generator in a broadcast system, the method comprising: providing a targeted user interface to a current user, wherein the current user is associated with a particular broadcasting station that is broadcasting data to end users; and managing remotely the PSIP data using the targeted user interface, wherein the step of providing the targeted user interface includes: determining, at a control center, characteristics of a user interface specific for the current user; generating the targeted user interface based on the determined characteristics; and installing the targeted user interface on the current user's device, and maintaining a count of user interfaces currently being accessed by non-end users to control access to the interfaces at a given time.

7. The method of claim 1, wherein the user interface is a graphical user interface (GUI) for modifying and managing the PSIP data.

8. A computer program product embodied on at least one computer readable medium, for remotely managing program and system information protocol (PSIP) data associated with a PSIP generator in a broadcast system, the computer program product comprising computer executable instructions for providing a targeted user interface to a current user at a remote location, wherein the current user is associated with a particular broadcasting station that is broadcasting data to end users; and managing remotely the PSIP data using the targeted user interface, wherein the computer executable instructions for providing the targeted user interface include computer executable instructions for; providing to the current user for the user's selection a list of available user interfaces for the PSIP generator through a communications network, and maintaining a count of user interfaces currently being accessed by non-end users to control access to the interfaces at a given time.

9. The computer program product of claim 8, wherein the computer executable instructions for providing the targeted user interface further includes computer executable instructions for:
providing to the current user through the communications network, as the targeted user interface, at least one of the user interfaces selected by the current user, whereby the current user can access the targeted user interface through the communications network.

10. The computer program product of claim 9, wherein the communications network is either the Internet or a private network.

11. The computer program product of claim 9, wherein the current user selects said at least one of the user interfaces using a web browser.

12. The computer program product of claim 9, wherein the computer executable instructions for providing the targeted user interface further include computer executable instructions for:
verifying an identity of the current user.

13. A computer program product embodied on at least one computer readable medium, for remotely managing program and system information protocol (PSIP) data associated with a PSIP generator in a broadcast system, the computer program product comprising computer executable instructions for: providing a targeted user interface to a current user, wherein the current user is associated with a particular broadcasting station that is broadcasting data to end users; and system, the managing remotely the PSIP data using the targeted user interface, wherein the computer executable instructions for providing the targeted user interface include computer executable instructions for: determining, at a control center, characteristics of a user interface specific for the current user; generating the targeted user interface based on the determined characteristics; and installing the targeted user interface on the current user's device, and maintaining a count of user interfaces currently being accessed by non-end users to control access to the interfaces at a given time.

14. The computer program product of claim 8, wherein the user interface is a graphical user interface (GUI) for modifying and managing the PSIP data.

15. The method of claim 6, wherein the determining step is performed based on credential data provided to the control center by the current user.

16. The method of claim 6, wherein the user interface is a graphical user interface (GUI) for modifying and managing the PSIP data.

17. The computer program product of claim 13, wherein the determining step is performed based on credential data provided to the control center by the current user.

18. The computer program product of claim 13, wherein the user interface is a graphical user interface (GUI) for modifying and managing the PSIP data.

19. A system for remotely managing program and system information protocol (PSIP) data associated with a PSIP generator in a broadcast environment, the system comprising: the PSIP generator configured to provide, through a communications network, a list of available user interfaces for the PSIP generator to a current user at a remote location, wherein the current user is associated with a particular broadcasting station that is broadcasting data to end users; to receive a user interface selected by the current user from the list of available user interfaces; and to provide, through the communications network, the user-selected user interface to the current user as a targeted user interface for the current user, whereby the PSIP data at the PSIP generator side can be remotely managed at the current user's side using the targeted user interface, wherein the PSIP generator is configured to maintain a count of user interfaces currently being accessed by non-end users to control access to the interfaces at a given time.

20. The system of claim 19, wherein the PSIP generator is also configured to verify an identity of the current user before providing the targeted user interface to the current user.

21. The system of claim 19, wherein the communications network is either the Internet or a private network.

22. The system of claim 19, wherein the communications network is either the Internet or a private network.

23. The system of claim 19, wherein the user interface is a graphical user interface (GUI) for modifying and managing the PSIP data.

24. A system for remotely managing program and system information protocol (PSIP) data associated with a PSIP generator in a broadcast environment, the system comprising: the PSIP generator, at a control center, configured to determine characteristics of a user interface specific for a current user, wherein the current user is associated with a particular broadcasting station that is broadcasting data to end users; configured to generate a targeted user interface for the current user based on the determined characteristics; and configured to install the targeted user interface on the current user's device, whereby the PSIP data at the PSIP generator side can be remotely managed at the current user's side using the targeted user interface, wherein the PSIP generator is configured to maintain a count of user interfaces currently being accessed by non-end users to control access to the interfaces at a given time.

25. The system of claim 24, wherein the metadata generator determines the characteristics of the user interface specific for the current user based on credential data provided to the control center by the current user.

26. The system of claim 24, wherein the user interface is a graphical user interface (GUI) for modifying and managing the PSIP data.

27. A method of remotely managing program and system information (PSIP) data in a digital TV (DTV) broadcast environment, the method comprising: establishing, by a DTV broadcast center, a control website for users at remote locations to access through at least one communications network, the control website providing tools for remotely managing the PSIP data managed at the DIV broadcast center; accessing the control website by a current user at a current remote location, wherein the current user is associated with a particular broadcasting station that is broadcasting data to end users; providing a list of graphical user interfaces (GUIs) for the current user's selection through the control website; receiving the current users selection of the GUI from the list; displaying, by the control website, the current user-selected GUI on a device of the current user as a targeted user interface for the current user; and remotely managing, at the current user's side, the PSIP data maintained at the DTV broadcast center's side, using the targeted user interface of the current user, and maintaining a count of user interfaces currently being accessed by non-end users to control access to the interfaces at a given time.

28. The method of claim 7, wherein the remotely managing step includes performing at least one of the following using the GUI under direction of the current user:
adding or modifying a TV event;
modifying an event overrun; or
modifying a service type.

29. The method of claim 16, wherein the remotely managing step includes performing at least one of the following using the GUI under direction of the current user:
adding or modifying a TV event;
modifying an event overrun; or
modifying a service type.

30. The computer program product of claim 14, wherein the computer executable instructions for remotely managing perform at least one of the following using the GUI under direction of the current user:
adding or modifying a TV event;
modifying an event overrun; or
modifying a service type.

31. The computer program product of claim 18, wherein the computer executable instructions for remotely managing perform at least one of the following using the GUI under direction of the current user:
adding or modifying a TV event;
modifying an event overrun; or
modifying a service type.

* * * * *